United States Patent
Bang et al.

(10) Patent No.: US 9,013,773 B2
(45) Date of Patent: Apr. 21, 2015

(54) BACK LIGHT UNIT PROVIDING DIRECTION CONTROLLABLE COLLIMATED LIGHT BEAM AND 3D DISPLAY USING THE SAME

(71) Applicant: LG Display Co., Ltd., Seoul (KR)

(72) Inventors: Hyungseok Bang, Goyang-si (KR); Heejin Im, Paju-si (KR); Guensik Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 200 days.

(21) Appl. No.: 13/716,855

(22) Filed: Dec. 17, 2012

(65) Prior Publication Data

US 2014/0092457 A1     Apr. 3, 2014

(30) Foreign Application Priority Data

Sep. 28, 2012   (KR) .......................... 10-2012-0108785

(51) Int. Cl.
 *G03H 1/26*  (2006.01)
 *G03B 5/04*  (2006.01)
 *G03H 1/22*  (2006.01)

(52) U.S. Cl.
 CPC ............. *G03H 1/26* (2013.01); *G03H 1/2202* (2013.01); *G03H 1/2286* (2013.01); *G03H 1/2294* (2013.01); *G03H 2001/2242* (2013.01); *G03H 2210/30* (2013.01); *G03H 2222/35* (2013.01); *G03H 2223/23* (2013.01)

(58) Field of Classification Search
 None
 See application file for complete search history.

(56) References Cited

U.S. PATENT DOCUMENTS

| 8,456,514 B2 * | 6/2013 | Leister .......................... 348/40 |
| 2010/0259804 A1 * | 10/2010 | Buschbeck et al. ............. 359/34 |

FOREIGN PATENT DOCUMENTS

| JP | 2003-195213 A | 7/2003 |
| KR | 10-2008-0111048 A | 12/2008 |
| KR | 10-2012-0020955 A | 3/2012 |

OTHER PUBLICATIONS

Korean Intellectual Property Office, Office Action, Korean Patent Application No. 10-2012-0108785, Mar. 28, 2014, five pages [with concise explanation of relevancy in English].
Korean Intellectual Property Office, Office Action, Korean Patent Application No. 10-2012-0108785, Jul. 31, 2014, five pages [with concise explanation of relevancy in English].

* cited by examiner

*Primary Examiner* — Jade R Chwasz
(74) *Attorney, Agent, or Firm* — Fenwick & West LLP

(57) ABSTRACT

A back light unit providing a direction controllable collimated light beam and a three-dimensional display using the same is described. A back light unit comprises: a light source for generating light; and a light direction controller for converting the light from the light source into a direction controlled collimated light beam having a refraction angle, the direction controlled collimated light beam emitted to a predetermined area to generate a three-dimensional holographic image. The back light unit can provide direction controllable collimation light having uniform brightness distribution over a large diagonal area of the spatial light modulator with thin and simple structure.

19 Claims, 12 Drawing Sheets

BACK LIGHT UNIT PROVIDING DIRECTION CONTROLLABLE COLLIMATED LIGHT BEAM AND 3D DISPLAY USING THE SAME

CROSS-REFERENCE TO RELATED APLICATIONS

This application claims the benefit of Korea Patent Application No. 10-2012-0108785 filed on Sep. 28, 2012, which is incorporated herein by reference for all purposes as if fully set forth herein.

BACKGROUND OF THE INVENTION

1. Field of the Invention

The present disclosure relates to a back light unit providing direction controllable collimated light beam and a three-dimensional display using the same. Especially, the present disclosure relates to a back light unit providing highly collimated light beam and controlling the direction of the collimated light beam and an auto-stereoscopy type three-dimensional display using the same.

2. Discussion of the Related Art

Recently, many technologies and researches for making and reproducing the 3D (three dimensional) image/video are being actively developed. As media relating to the 3D image/video is a new concept for virtual reality, it can improve the visual information, and it will lead the next generation display devices. The conventional 2D (two dimensional) image system merely suggests the image and video data projected to plan view, but the 3D image system can provide the full real image data to the viewer. So, the 3D image/video technologies are the more efficient image/video technologies.

Typically there are five methods for reproducing 3D image/video: the stereoscopy method, the auto-stereoscopy method, the volumetric method, the holography method, and the integral imaging method. Among them, the holography method uses a laser beam so that it is possible to observe the 3D image/video with naked eyes (i.e., without the need for glasses). The holography method is the most ideal method because it has an excellent visual stereoscopic property without any fatigue of observer.

To produce a recording of the phase of the light wave at each point in an image, holography uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

There was a new development of the computer generated holography (or CGH) that is the method of digitally generating holographic interference patterns. A holographic image can be generated e.g. by digitally computing a holographic interference pattern and printing it onto a mask or film for subsequent illumination by suitable coherent light source. The holographic image can be brought to life by a holographic 3D display, bypassing the need of having to fabricate a "hardcopy" of the holographic interference pattern each time.

Computer generated holograms have the advantage that the objects which one wants to show do not have to possess any physical reality at all. If holographic data of existing objects is generated optically, but digitally recorded and processed, and brought to display subsequently, this is termed CGH as well. For example, a holographic interference pattern is generated by a computer system and it is sent to a spatial light modulator such as LCSLM (Liquid Crystal Spatial Light Modulator), then the 3D image/video corresponding to the holographic interference pattern is reconstructed/reproduced by radiating a reference beam to the spatial light modulator. FIG. 1 is the structural drawing illustrating the digital holography image/video display device using the computer generated holography according to the related art.

Referring to FIG. 1, the computer 10 generates a holographic interference pattern of an image/video data to be displayed. The generated holographic interference pattern is sent to a SLM 20. The SLM 20, as a transmittive liquid crystal display device, can represent the holographic interference pattern. At one side of the SLM 20, a laser source 32 for generating a reference beam is located. In order to radiate the reference beam 90 from the laser source 32 onto the whole surface of the SLM 20, an expander 40, and a lens system 50 can be disposed, sequentially. The reference beam 90 generated from the laser source 32 is radiated to one side of the SLM 20 passing through the expander 40 and the lens system 50. As the SLM 20 is a transmittive liquid crystal display device, a 3D image/video corresponding to the holography interference pattern will be reconstructed/reproduced at the other side of the SLM 20.

The holography type 3D display system according to the FIG. 1 comprises a back light unit BLU for generating a reference light (i.e., a light beam) 90 satisfying certain condition and for providing the back light from the reference light 90 to a SLM (Spatial Light Modulator) 20 having a large diagonal area. In FIG. 1, the back light unit BLU comprises light source 30 for generating the reference light 90, an expander 40 and a lens system 50 which have relatively large volume. In a case that the holography 3D display system having this back light unit BLU is configured, the brightness (or luminescence) of the back light is not evenly distributed over the large area of the SLM 20 because the light brightness distribution of the light source 32 has the Gaussian profile. Furthermore, in order to reduce the high-level mode noise of the diffracted light of the reference light 90 which may cause the image noise, the incident light may have certain incident angle to the SLM 20. In that case, the collimation property may be damaged.

For overcoming this problem of the related art, a back light system for maintaining the collimation property of the incident light to the SLM even if it is entering into the SLM with an incident angle enough for reducing the $0^{th}$ mode noise of the diffracted light is under developed. There is a system, for example, in which a collimation lens is used. FIG. 2A is a schematic view illustrating a back light unit generating the collimated light beam using a collimation lens.

Referring to FIG. 2A, a point light source is placed at the light source 30, and a collimation lens CL is placed at the focal point of the collimation lens CL from the light source 30. Then, the light radiated from the light source 30 can be a collimated light beam 100 after passing the collimation lens CL. That is, the radiated light in the collimated light beam 100 is substantially parallel to one another after passing the collimation lens CL. This collimated light can be used for a reference light in the holography 3D display.

In the most cases of the holography 3D display systems, the reference light should enter into the spatial light modulator with certain incident angle. The light diffraction elements, such as SLM, can make the 0th mode image, 1st mode image and the higher-level mode images. The 1$^{st}$ mode image and higher level mode images are considered noise. In order to eliminate or reduce the higher-level mode images, it is preferable to radiate the light into the light diffraction element with certain incident angle.

To do so, in the back light unit shown in the FIG. 2A, the position of the light source 30 can be shifted to one side from the center of the light axis 130 to make the incident angle. FIG. 2B is a schematic view illustrating the back light unit generating the collimated light propagating with certain incident angle by the collimation lens CL.

Referring to FIG. 2B, the point light source 30 is moved upward from the light axis 130 so that the incident angle from the moved point to the center of the collimation lens CL can be α. Then, theoretically, as the dotted line of the FIG. 2B, the collimated light 100 can propagate to the inclined direction with α° from the parallel direction to the light axis 130 which represents the ideal path for the collimated light 100. However, the actual path of the inclined light cannot be collimated (or parallel) light having incident angle α, as repsented by the solid line of FIG. 2B. As a result, the collimated light from the back light unit cannot be illustrated to a target area with evenly distributed brightness but rather has a distorted area profile.

SUMMARY OF THE INVENTION

In order to overcome the above mentioned drawbacks, the purpose of the present disclosure is to suggest a back light unit providing direction controllable collimated light beam and a 3D display system using the same back light unit. Another purpose of the present disclosure is to suggest a back light unit generating collimated back light beam using a laser beam source with a hologram optical element and providing the collimated back light to a controlled direction with uniformed brightness distribution, and a 3D display system using the same back light unit.

In order to accomplish the above purpose, the present disclosure suggests a back light unit comprising a light source for generating light; and a light direction controller for converting the light from the light source into a direction controlled collimated light beam having a refraction angle, the direction controlled collimated light beam emitted to a predetermined area to generate a three-dimensional holographic image.

Furthermore, the present disclosure suggests a display system comprising a display panel for outputting a three-dimensional holographic image; and a back light unit positioned at a rear side of the display panel, the back light unit including: a light source for generating light; and a light direction controller for converting the light from the light source into a direction controlled collimated light beam having a refraction angle, the direction controlled collimated light beam emitted to a predetermined area of the display panel to generate the three-dimensional holographic image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
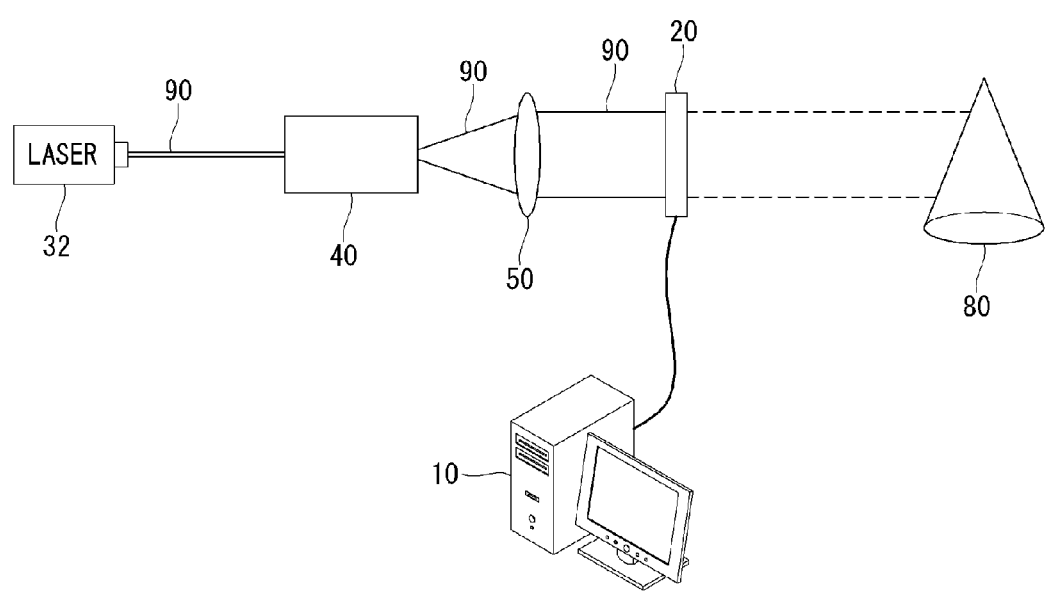
FIG. 1 is the structural view illustrating the digital holography image/video display device using the computer generated holography according to the related art.
Figure 2A:
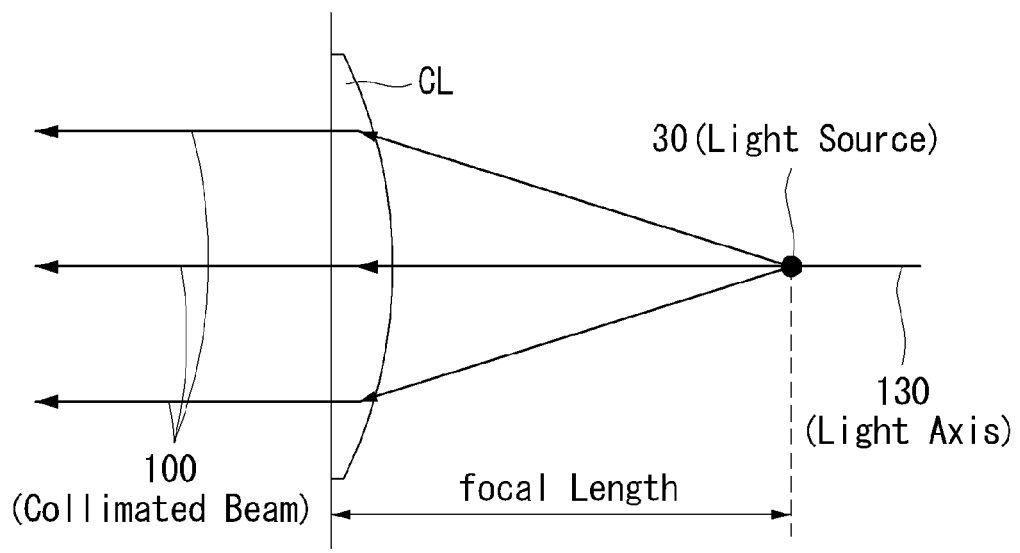
FIG. 2A is a schematic view illustrating a back light unit generating the collimated light beam using a collimation lens according to the related art.
Figure 2B:
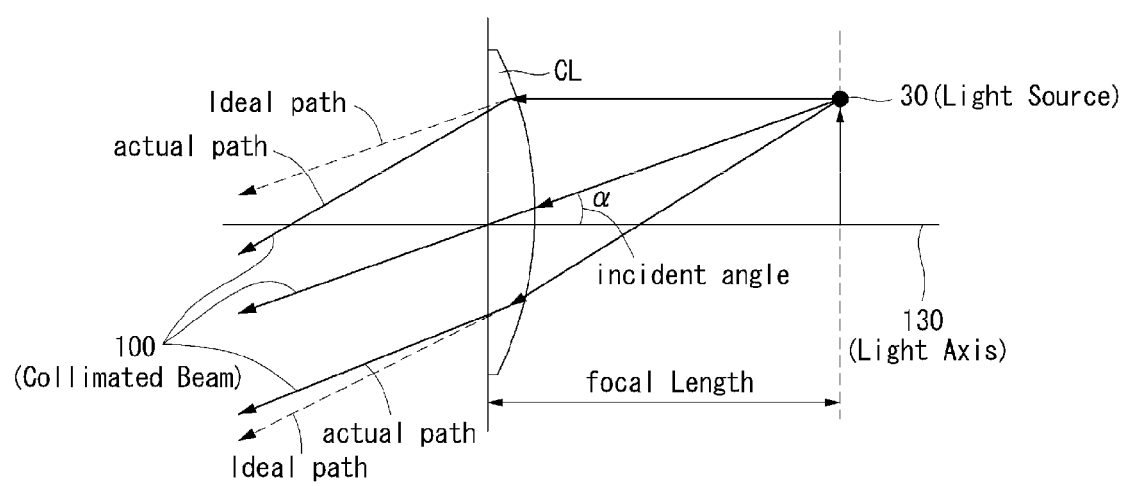
FIG. 2B is a schematic view illustrating the back light unit generating the collimated light propagating with certain incident angle by the collimation lens according to the realted art.

Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

The present disclosure, relating to a back light unit and a 3D display using the same back light unit, includes a light source generating collimated light. Furthermore, it includes a light controller, after receiving the light from the light source, which can radiate an inclined collimated light having an incident angle to the light axis and/or illustrate to a defined viewing area. The features of the present disclosure are on the variations of the light source and the variations of the light controller according to the various light sources. Hereinafter, we will explain about various embodiments.

Figure 3A:
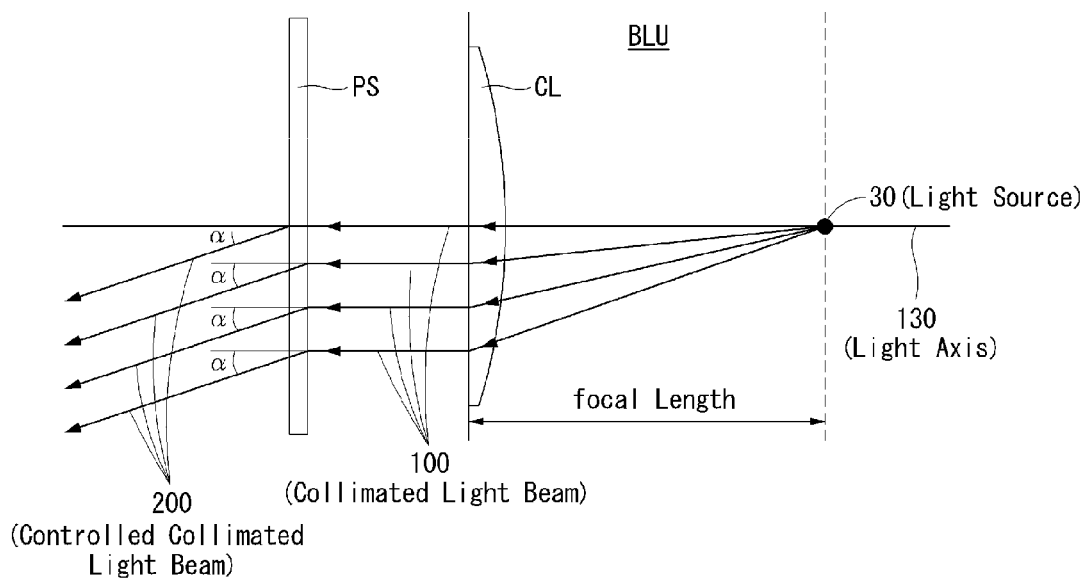
FIG. 3A is a schematic view illustrating a back light unit providing the direction controllable collimated light using a point light source according to the first embodiment of the present disclosure.

At first referring to FIG. 3A, we will explain about the first embodiments of the present disclosure. FIG. 3A is a schematic view illustrating the back light unit BLU providing the direction controllable collimated light using a point light source according to the first embodiment of the present disclosure.

The back light unit BLU according to the first embodiment of the present disclosure comprises a collimation lens CL, a point light source 30 positioned at the one side of the collimation lens CL, and a prism sheet PS located at the other side of the collimation lens CL. In one embodiment, the collimation lens CL and the prism sheet PS represent a light direction controller for converting the light from the point light source 30 into direction controlled collimated light as will be further described below. The point light source 30 can radiate light from one point to all radial directions. In order to guide the light from the point light source 30 to the collimation lens CL, a mirror (not shown) may be disposed behind of the point light source 30.

It is preferable that the point light source 30 is located on the focal plane of the collimation lens CL. More preferably, the point light source 30 would be located on the light axis 130 linking the center point of the collimation lens and the center point of the focal plane of the collimation lens CL and positioned a focal length in distance from a first side of the collimation lens CL.

The collimation lens CL can convert the light received from the point light source 30 to the collimated light beam 100. That is, the collimated light beam 100 is propagating parallel with the light axis 130. The collimation lens CL may include an optical lens such as Fresnel lens.

The prism sheet PS can be located at a second side of the collimation lens CL that is opposite to the point light source 30. The prism sheet PS can bend the propagating direction of the collimated light beam 100 from the collimation lens CL with a refraction angle α to a vertical direction from the light axis 130. For example, holding the parallel property of the collimated light beam 100, the prism sheet PS can change the propagating direction of the collimated light beam 100 downward with α° from the light axis. That is, the prism sheet PS can change the collimated light beam 100 to the direction controlled collimated light beam 200. The prism sheet PS may include a Fresnel prism sheet.

Figure 3B:
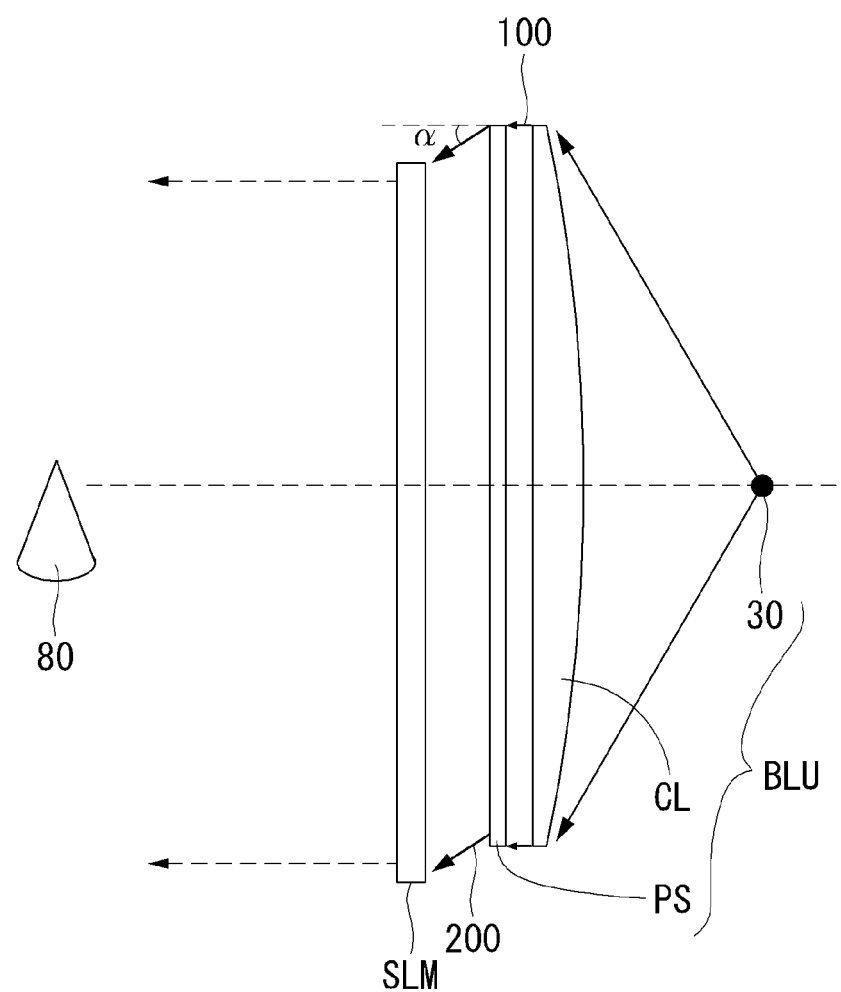
FIG. 3B is a schematic view illustrating a holography 3D display system using the back light unit according to the first embodiment of the present disclosure.

Now, we will explain about a holography 3D display system using the back light unit according to the first embodiment of the present disclosure. FIG. 3B is a schematic view illustrating a holography 3D display system using the back light unit according to the first embodiment of the present disclosure.

Referring to FIG. 3B, the 3D display according to the first embodiment comprises a spatial light modulator SLM representing the hologram patterns corresponding to the holography 3D images and a back light unit BLU disposed at the rear side of the spatial light modulator SLM. The back light unit BLU, having the same structure shown in FIG. 3A, comprises a collimation lens CL, a point light source 30 positioned at the one side of the collimation lens CL, and a prism sheet PS located at the other side of the collimation lens CL. Here, the sizes and the shapes of the collimation lens CL and the prism sheet PS may be substantially same with those of the spatial light modulator SLM. As the spatial light modulator SLM should be located on the light path bent downward (or upward) direction with certain angle (i.e. α°) from the prism sheet PS, the spatial light modulator SLM is slightly misaligned with the back light unit BLU.

The holography 3D display system according to the present disclosure can use the spatial light modulator SLM, one of holography optical elements. The spatial light modulator SLM represents the same patterns with the diffraction patterns between the collimated reference light and the object light. That is, the hologram patterns representing the spatial light modulator SLM is the same patterns of the diffraction interference patterns which can written on a holography optical element when a reference light beam (collimated light beam) and an object light beam (reflected from an object by radiating the same light beam with the reference light beam onto the object) are incident to the holography optical element with a certain angle. When the spatial light modulator SLM represents the diffraction interference patterns and a light beam with the reference light beam is radiated to the spatial light modulator SLM, the object light beam is regenerated (or reconstructed) from the spatial light modulator SLM and the 3D images 80 corresponding to the object is generated.

Here, as the diffraction interference patterns are made by the object light beam and the reference light beam with certain angle α between them, in order for the object light to be reproduced when the reference light beam is radiated to the spatial light modulator SLM is sent to the observer's position, the reference light beam should enter into the spatial light modulator SLM with the incident angle α (here, the front position of the observer is located on the light axis 130).

Therefore, for the back light unit BLU according to the first embodiment of the present disclosure, the propagation direction of the collimated light beam 100 can be controlled to be bent with angle of α from the light axis 130, so that it is possible to build the holography 3D display system as shown in FIG. 3B. Using the thin type collimation lens CL and the prism sheet PS, the back light unit BLU can be made in thin type.

Figure 4A:
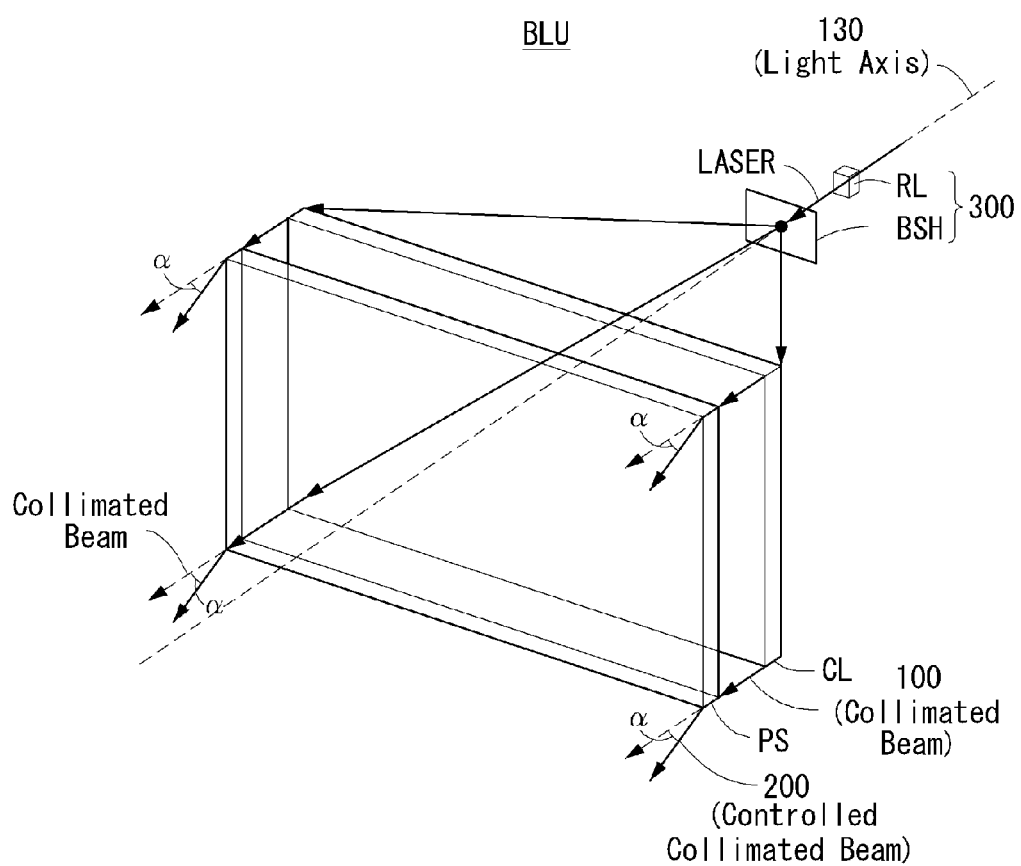
FIG. 4A is a schematic view illustrating the structure of the back light unit providing the direction controllable collimated light beam using the hologram optical elements as the light source according to the second embodiment of the present disclosure.

Hereinafter, referring to FIG. 4A, we will explain about the second embodiment of the present disclosure. FIG. 4A is a schematic view illustrating the structure of the back light unit BLU providing the direction controllable collimated light beam using the hologram optical elements as the light source according to the second embodiment of the present disclosure.

The back light unit BLU according to the second embodiment of the present disclosure comprises a collimation lens CL, a light source 300 located at one side of the collimation lens CL, and a prism sheet PS positioned at the other side of the collimation lens CL. Most elements according to the second embodiment of the present disclosure are substantially the same with those of the first embodiment. The difference is the structure of the light source 300. For the first embodiment, the light source is the point light source 30. However, in the second embodiment, the light source has a more complex structure. The strength of the light from the point light source 30 used in the first embodiment is inversely proportional to the square of the length from the light source 30. Therefore, when the collimation lens CL should have a large area, the light luminescence at the center portion is severely different from the light luminesecne at the circumference portions of the collimation lens CL. In order to solve the further problem, in the second embodiment of the present disclosure, the light source 300 can provide the back light from a small area to a large area with uniformed luminescence.

The light source 300 of the second embodiment includes a holographic optical film BSH having patterns corresponding to the light radiating area. For example, the holographic optical film BSH, called as BS-HOE (Beam-Shaped Holographic Optical Element Film), can be used. The BS-HOE may be a small piece of film having a holographic pattern. As the BS- HOE uses the feature of the hologram, it has the diffraction interference patterns of the reference light beam and the object light beam. Especially, this diffraction interference patterns may include the patterns for uniformly radiating the object light beam regenerated by the BS-HOE to a certain area when the reference light beam is radiated onto the BS-HOE.

For example, when a laser beam LASER is used as a reference light beam and is radiated from the rear side of the holographic optical film BSH, a light having a large area corresponding to the diagonal area of the collimation lens CL is generated to the front side of the holographic optical film BSH. More particularly, the light source 300 according to the second embodiment comprises a holographic optical film BSH having a diffraction pattern for radiating a diverging light to a large area, and a reference light source RL for providing the reference light to the holographic optical film BSH.

The reference light source RL may be a laser source providing a collimated light beam. For example, using a laser light emitting diode (LED), the reference light beam can be provided to the holographic optical film BSH. For the case that the laser LED is used as the reference light source RL, the reference light beam may be the plane wave light. In other hand, the reference light source RL may be a point light source. In the case of the point light source, the reference light may be spherical wave light.

Here, in convenience, the laser LED is used. The laser beam generated from the reference light source RL, the laser LED, is radiated to the holographic optical film BSH. Then, by the pattern written on holographic optical film BSH, the diverging light corresponding to the area of the collimation lens CL with the uniformed luminescence distribution can be sent to the collimation lens CL (according to the reference light, it may be the spherical wave light or the plane wave light).

The light source 300 is preferably located on the focal plane of the collimation lens CL. Especially, the holographic optical film BSH and the reference light source RL comprising the light source 300 are preferably located on the light axis 130 connecting from the center of the collimation lens CL to the center of the focal plane of the collimation lens CL.

The collimation lens CL can convert the light from the holographic optical film BSH to the collimated light beam 100. The collimation lens CL may include an optical lens such as Fresnel lens.

The prism sheet PS is preferably positioned at the opposite side from the light source 300 based on the collimation lens CL. The prism sheet PS may bend the propagating direction of the collimated light beam 100 generated by the collimation lens CL to a vertical direction with certain angle of α from the light axis 130. For example, holding the parallel (or collimation) properties of the collimated light beam 100, the prism sheet PS can change the propagation direction downward with α° from the light axis 130. That is, the prism sheet PS can change the collimated light 100 into the direction controlled collimated light beam 200. The prism sheet PS may include the Fresnel prism sheet.

Figure 4B:
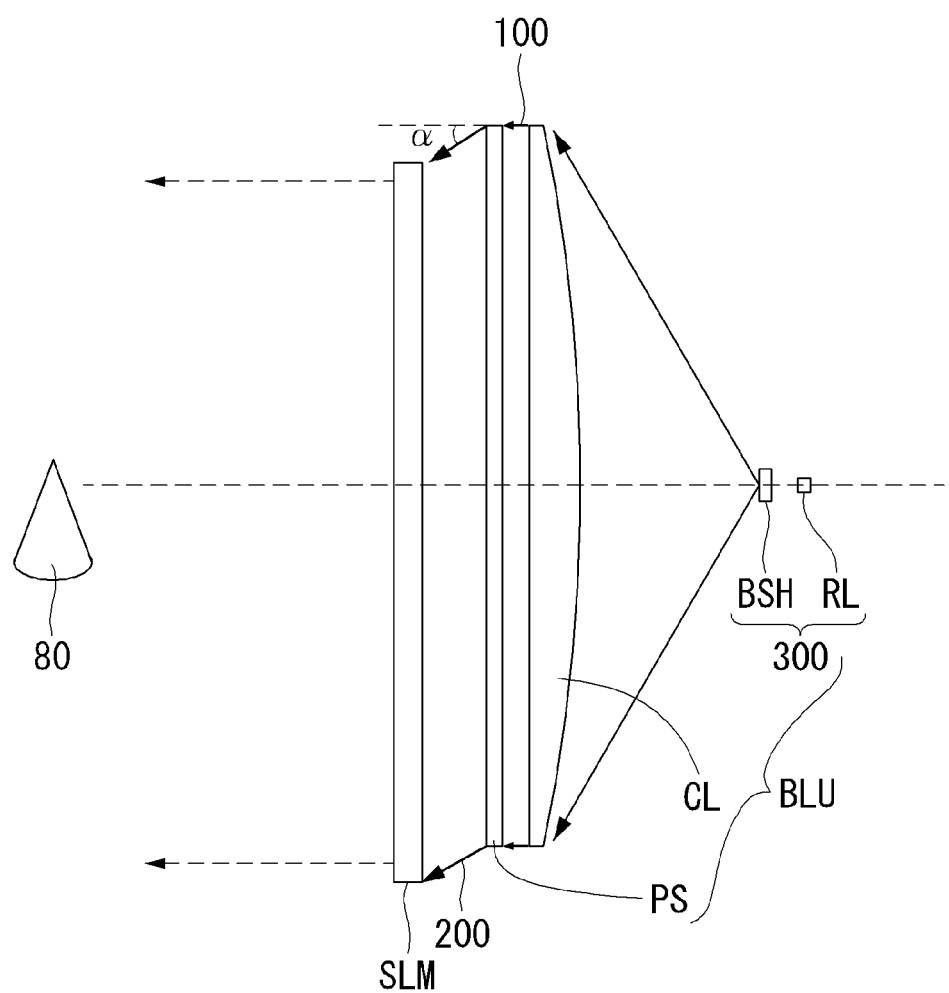
FIG. 4B is a schematic cross sectional view illustrating the holography 3D display system using the back light unit according to the second embodiment of the present disclosure.

Now, we will explain about the holography 3D display system using the back light unit according to the second embodiment of the present disclosure. FIG. 4B is a schematic cross sectional view illustrating the holography 3D display system using the back light unit BLU according to the second embodiment of the present disclosure.

Referring to FIG. 4B, the 3D display system according to the second embodiment comprises a spatial light modulator SLM representing a hologram pattern corresponding to the holography image to be represented, and a back light unit BLU disposed at rear side of the spatial light modulator SLM. The back light unit BLU, having the same structure shown in FIG. 4A, comprises a collimation lens CL, a light source 300 positioned at the one side of the collimation lens CL, and a prism sheet PS located at the other side of the collimation lens CL. Here, the sizes and the shapes of the collimation lens CL and the prism sheet PS may be substantially same with those of the spatial light modulator SLM. As the spatial light modulator SLM should be located on the light path bent downward (or upward) direction with certain angle (i.e. α°) from the prism sheet PS, the spatial light modulator SLM is slightly mis-aligned with the back light unit BLU.

Like the first embodiment, the back light unit BLU according to the second embodiment can control the propagation direction of the collimated light beam 100 to be bent with angle of α from the light axis 130 by the prism sheet PS. Therefore, it is possible to build the holography 3D display system as shown in FIG. 4B. Especially, as the holographic optical film BSH is used for the light source 300, the back light unit BLU can have more uniformly distributed light luminescence over a large diagonal area and be thinner than the back light unit according to the first embodiment.

Figure 5A:
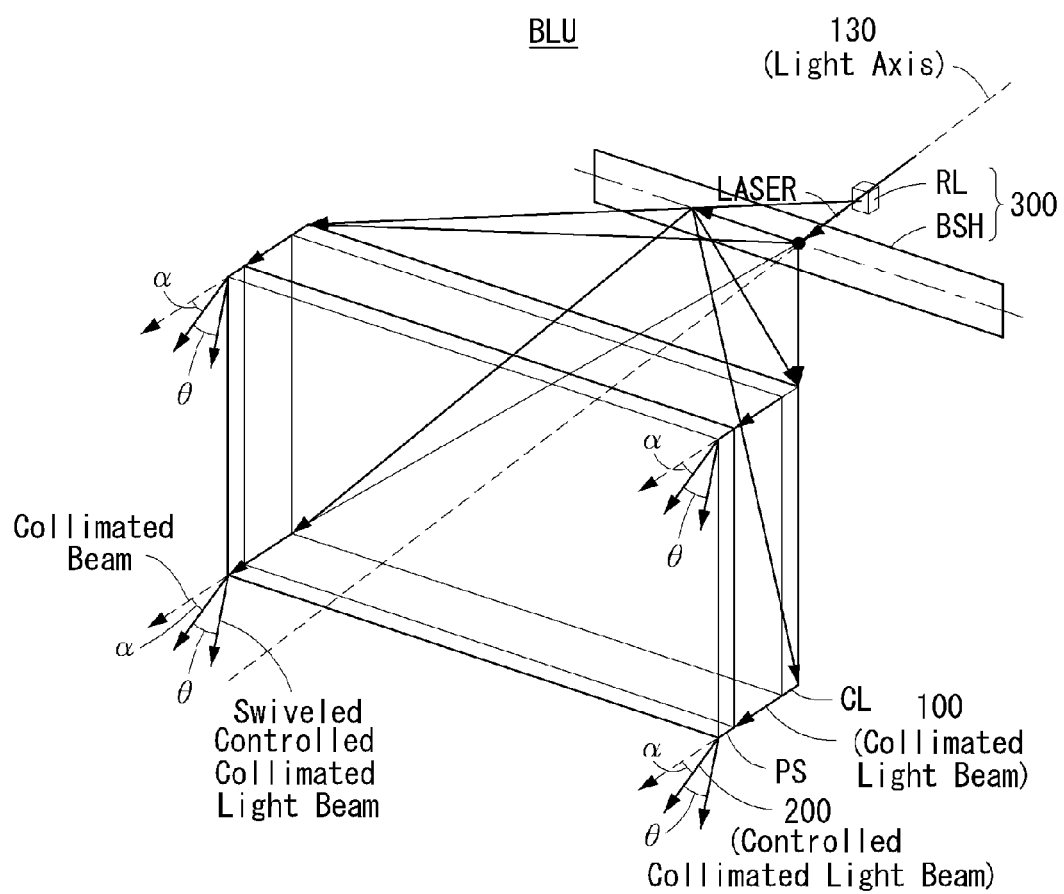
FIG. 5A is a schematic view illustrating the structure of the back light unit providing the direction controllable collimated light beam using the hologram optical elements as the light source according to the second embodiment of the present disclosure.

Hereinafter, referring to FIG. 5A, we will explain about the third embodiment of the present disclosure. FIG. 5A is a schematic view illustrating the structure of the back light unit providing the direction controllable collimated light beam using the hologram optical elements as the light source according to the second embodiment of the present disclosure.

The back light unit BLU according to the third embodiment of the present disclosure comprises a collimation lens CL, a light source 300 located at the one side of the collimation lens CL, and a prism sheet PS positioned at the other side of the collimation lens CL. Most elements according to the third embodiment of the present disclosure are substantially same with those of the second embodiment. However, the light source 300 according to the third embodiment may be same with that of the first embodiment or that of the second embodiment. In the third embodiment, we will explain about another type of light source.

The light source 300 according to the third embodiment comprises a holographic optical film BSH having the pattern corresponding to the light radiating area. For example, the holographic optical film BSH, called as BS-HOE (Beam-Shaped Holographic Optical Element Film), can be used. As the BS-HOE has the diffraction interference patterns of the reference light beam and the object light beam, when the reference light beam is radiated onto the BS-HOE, the emitted light can cover the pre-determined area with uniformed luminescence distribution.

Referring to FIG. 5A, like the second embodiment, the light source 300 according to the third embodiment comprises a holographic optical film BSH having a diffraction pattern for radiating a diverging light to a large area, and a reference light source RL for providing the reference light to the holographic optical film BSH. Like the second embodiment, the reference light source RL may be one of the light source generating the plane wave light and the light source generating the spherical wave light. Here, in convenience, the laser LED is used.

Like the second embodiment, the collimation lens CL can make the light from the holographic optical film BSH the collimated light beam 100. The prism sheet PS is preferably positioned at the opposite side from the light source 300 based on the collimation lens CL. The prism sheet PS can change the collimated light 100 into the direction controlled collimated light beam 200.

On the other hand, the holographic optical film BSH, comparing with those of the second embodiment, has a horizontally long rectangular shape. This allows for the reference light from the reference light source RL to be radiated to the left side or the right side from the center position on the holographic optical film BSH.

For example, when the reference light is radiated to the center of the holographic optical film BSH, the emitted light from the holographic optical film BSH is, the direction controlled collimated light beam 200, like the second embodiment as shown in the FIG. 4A. That is, the light beam from the reference light source RL is expanded corresponding to the size of the collimation lens CL as passing through the holographic optical film BSH, changed into the collimated light beam 100 by the collimated lens CL, and changed into the direction controlled collimated light 200 of which propagation direction is bent with angle of α by the prism sheet PS.

However, referring to FIG. 5A, when the reference light is shifted (i.e., directed) to the horizontally left side of the center of the holographic optical film BSH (when seeing it from the front direction), the finally emitted light beam can be shifted to the right side with certain angle of θ from the angle α. On the contrary, when the reference light is shifted to the horizontally right side of the center of the holographic optical film BSH, the emitted light beam can be shifted to the left side with certain angle of θ from the angle α. That is, as the radiating position of the light from the light source 300 can be scanned from left side to right side, the back light beam from the back light unit BLU can be the swiveled to control the direction of the controlled collimated light beam 200.

The back light unit according to the third embodiment can be applied to various examples including the multi-view display. For example, the first image can be represented at the front direction during a first time period, the second image can be represented to the right side of the front direction with angle of θ from the center during the second time period, and the third image can be represented at the left side of the front direction with the angle of θ from the center during the third time period.

Even though not shown in figures, in order to scan the reference light from the reference light source RL over the holographic optical film BSH from left to the right side along the horizontal direction, a scanning device may be further included in the reference light source RL. For example, a mechanical device for pivoting or reciprocally moving the reference light source RL may be further included. Otherwise, an optical device such as mirror (or the reflecting device) and a mechanical device for controlling the reflection angle of the mirror may be included.

Figure 5B:
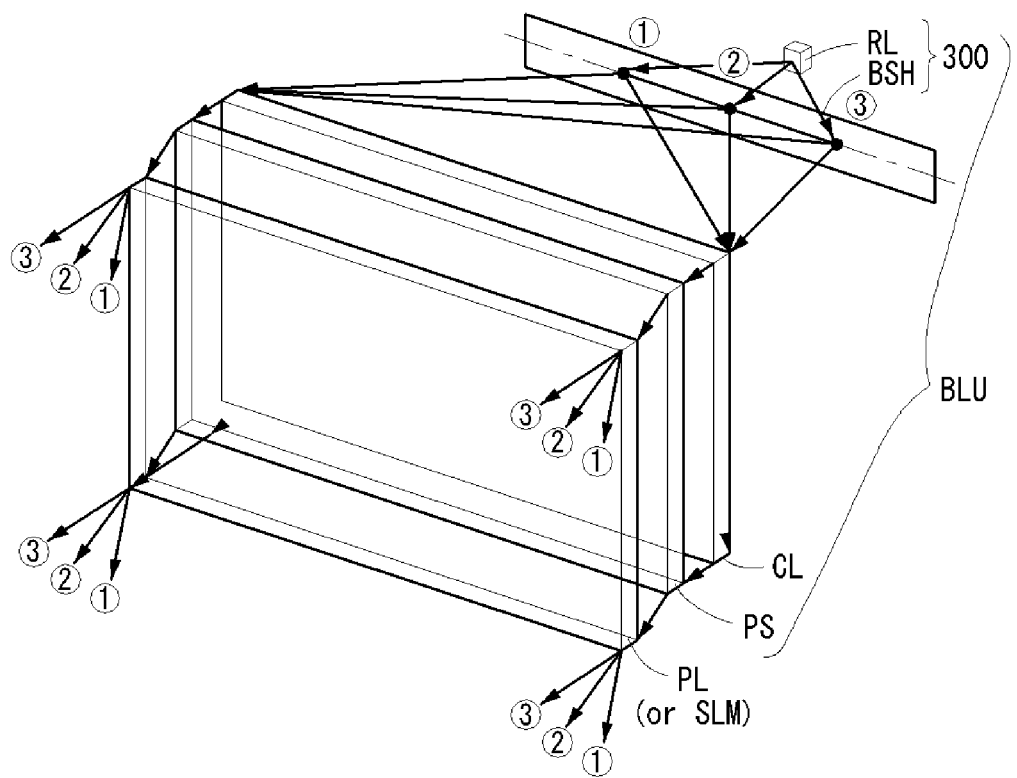
FIG. 5B is a schematic view illustrating the multi-view display using the back light unit according to the third embodiment.

Now we will explain about a multi-view display applied with the back light unit according to the third embodiment. FIG. 5B is a schematic view illustrating the multi-view display using the back light unit according to the third embodiment.

The multi-view display can be applied to a display system in which different two images are presented to two different observers, respectively or to a 3D display system in which different views of the 3D image are represented according to the viewing direction. Referring to FIG. 5B, the multi-view display according to the present disclosure comprises a display panel LP representing 2D or 3D images/videos, and a back light unit BLU disposed at rear side of the display panel LP. The back light unit BLU, having the same structure shown in FIG. 5A, includes a collimation lens CL, a light source 300 positioned at the one side of the collimation lens CL, and a prism sheet PS located at the other side of the collimation lens CL.

Here, the sizes and the shapes of the collimation lens CL and the prism sheet PS may be substantially same with those of the display panel LP. As the display panel LP should be located on the light path bent downward (or upward) direction with certain angle (i.e. α°) from the prism sheet PS, the display panel LP is slightly mis-aligned with the back light unit.

Like the second embodiment, the back light unit BLU according to the third embodiment can control the propagation direction of the collimated light beam 100 to be bent with angle of α from the light axis 130 by the prism sheet PS to provide the direction controlled collimated light beam 200. Furthermore, as the radiating position of the reference light on the holographic optical film BSH of the light source 300 can be scanned from left side to right side, it is possible to provide different images represented by the display panel LP to different direction. Especially, as the holographic optical film BSH is used for the light source 300, the back light unit BLU can have more uniformly distributed light luminescence over a large diagonal area with the thin structure.

As shown in FIG. 5B, if the light source 300 directs light to position 1 of the holographic optical film BSH that corresponds to a position left of the center of the holographic optical film BSH, the display panel PL emits a light beam 1 with the angle of θ that is shifted to the right side of the angle α (i.e., light beam 2). In contrast, if the light source 300 directs light to position 2 of the holographic optical film BSH that corresponds to the center of the holographic optical film BSH, the display panel PL emits light beam 2 with the angle α. Lastly, if the light source 300 directs light to position 3 of the holographic optical film BSH that corresponds to a position right of the center of the holographic optical film BSH, the display panel PL emits a light beam 3 with the angle of θ that is shifted to the left side of the angle α (i.e., light beam 2).

Figure 6A:
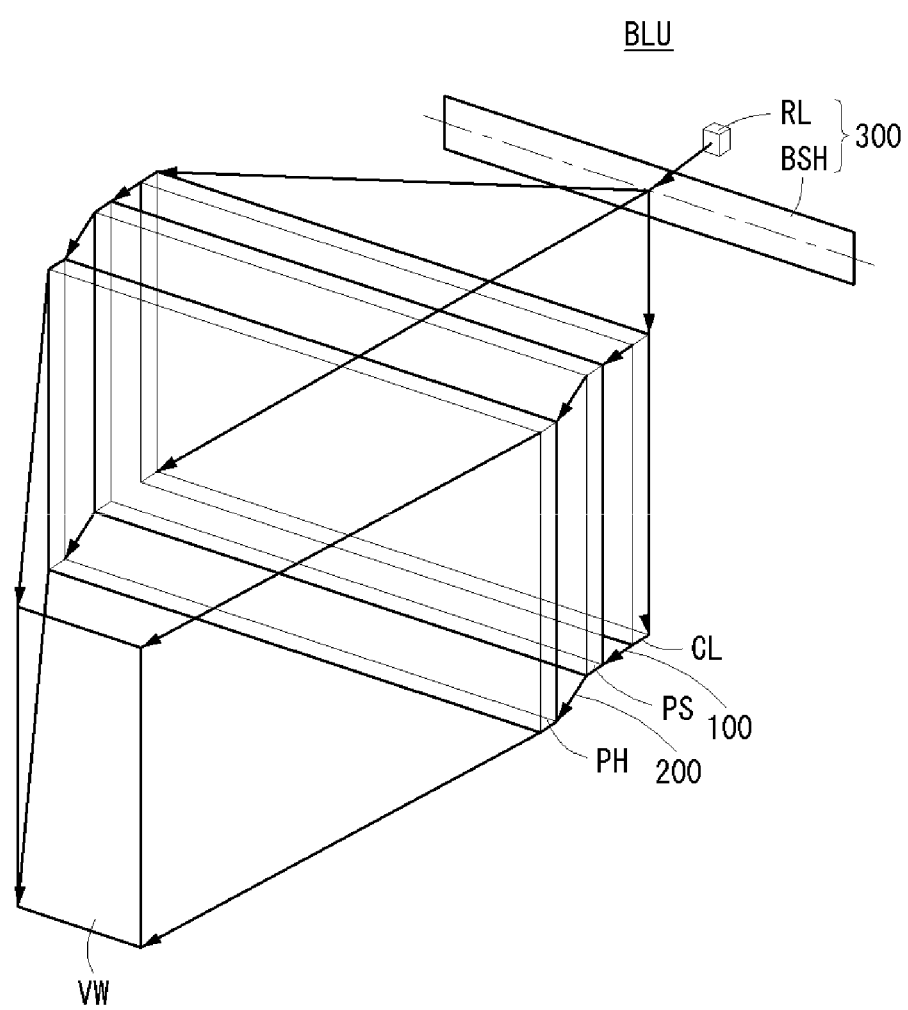
FIG. 6A is a schematic view illustrating a structure of the back light unit providing the direction controllable collimated light beam using the hologram optical elements as the light source according to the fourth embodiment of the present disclosure.

Hereinafter, referring to FIG. 6A, we will explain about the fourth embodiment of the present disclosure. FIG. 6A is a schematic view illustrating a structure of the back light unit BLU providing the direction controllable collimated light beam using the hologram optical elements as the light source according to the fourth embodiment of the present disclosure.

The back light unit BLU according to the fourth embodiment of the present disclosure comprises a collimation lens CL, a light source 300 located at the one side of the collimation lens CL, a prism sheet PS positioned at the other side of the collimation lens CL, and a viewing area control film PH disposed at the front side of the prism sheet PS. The fourth embodiment comprises the viewing area control film PH for controlling the radiation area of the light from the prism sheet PS within pre-determined area.

The light source 300 of the fourth embodiment may be any one light source presented in the first to third embodiments. In convenience, we will use the case of third embodiment. That is, the size and the shape of the holographic optical film BSH are same with those of the third embodiment, the horizontally long rectangle. To do so, the reference light from the reference light source RL can be radiated to the left side or the right side from the center position on the holographic optical film BSH.

With this structure, when the reference light beam is radiated to the center of the holographic optical film BSH (i.e. along to the light axis 130), the finally emitted back light is radiated within the viewing area (or viewing window) VW pre-determined by the viewing area control film PH. The light beam from the reference light source RL is expanded corresponding to the size of the collimation lens CL as passing through the holographic optical film BSH, changed into the collimated light beam 100 by the collimated lens CL, changed into the direction controlled collimated light 200 of which propagation direction is bent with angle of α by the prism sheet PS, and radiated within the viewing area VW decided by the hologaphy interference pattern included in the viewing area control film PH.

Furthermore, as the reference light is shifted to the horizontally left side of the holographic optical film BSH, the finally emitted light beam can be shifted to the right side with certain angle. On the contrary, as the reference light is shifted to the horizontally right side of the holographic optical film BSH, the finally emitted light beam can be shifted to the left side with certain angle.

Figure 6B:
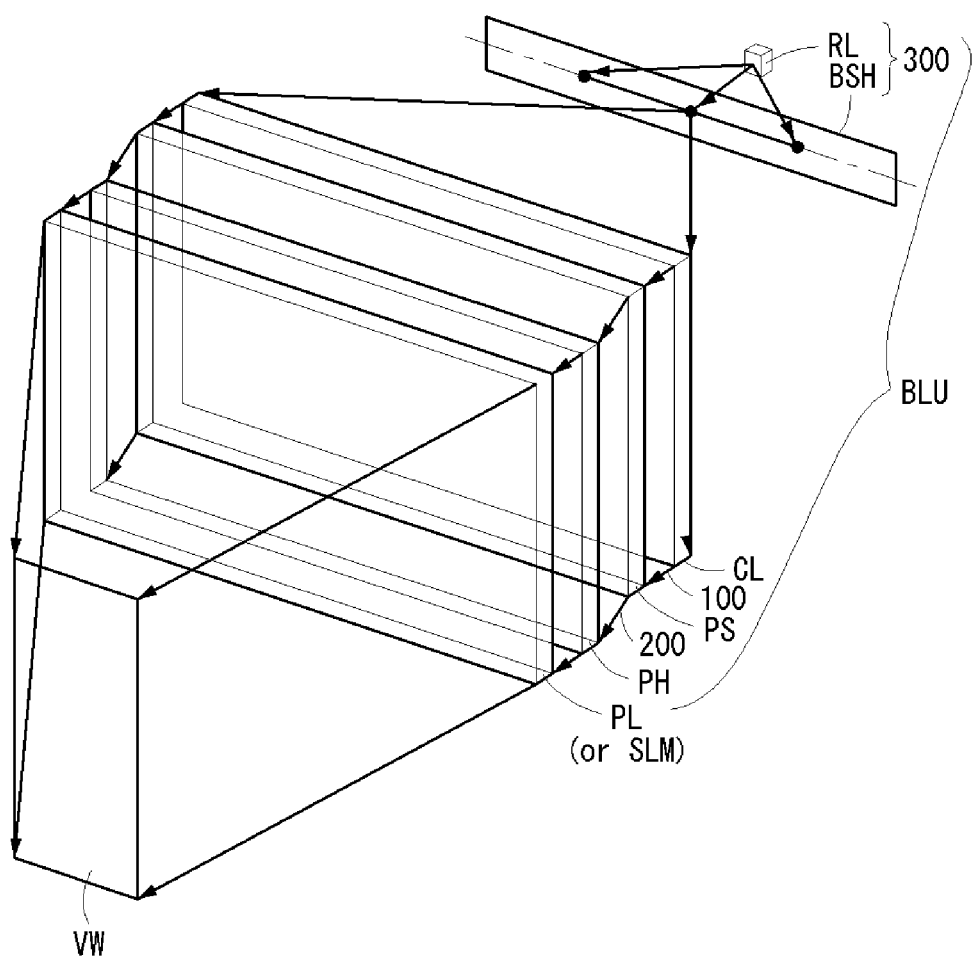
FIG. 6B is a schematic view illustrating a CVD applied with the back light unit according to the fourth embodiment of the present disclosure.

We will explain about the controlled viewing-window display (CVD) using the back light unit according to the fourth embodiment of the present disclosure. FIG. 6B is a schematic view illustrating CVD applied with the back light unit according to the fourth embodiment of the present disclosure. The CVD is a display system in which the image/video represented on the large area display panel is radiated within a pre-determined narrow area, the controlled viewing window.

Referring to FIG. 6B, the CVD according to the present disclosure comprises a display panel PL representing 2D or 3D image/video, and a back light unit BLU disposed at the rear side of the display panel PL. The back light unit BLU, having the same structure shown in FIG. 5A, includes a collimation lens CL, a light source 300 positioned at the one side of the collimation lens CL, a prism sheet PS located at the other side of the collimation lens CL, and a viewing area control film PH. Here, the sizes and the shapes of the collimation lens CL and the prism sheet PS may be substantially same with those of the display panel LP. As the display panel LP should be located on the light path bent downward (or upward) direction with certain angle from the prism sheet PS, the display panel LP is slightly mis-aligned with the back light unit.

Like the third embodiment, the back light unit BLU according to the fourth embodiment can control the propagation direction of the collimated light beam 100 to be bent with angle of α from the light axis 130 by the prism sheet PS to provide the direction controlled collimated light beam 200. Furthermore, the view area control film PH disposed at the front side of the prism sheet PS allows for the viewing area to be controlled within the pre-determined area.

In addition, even though not shown in figures, if it is required to scan the viewing area VW from left side to right side, the third embodiment can be applied with the fourth embodiment. For example, as the reference light beam can be scanned from left side to the right side on the holographic optical film BSH, the different images/videos represented on the display panel LP can be presented at different positions, respectively. Especially, as the holographic optical film BSH is used for the light source 300, the back light unit BLU can have more uniformly distributed light luminescence over a large diagonal area with the thin structure.

Until now, we will explain the embodiments focusing on the back light unit generating the plane wave light beam. Whether the light provided from the light source is the plane wave light or the spherical wave light, in the above mentioned embodiments, the back light units provide the collimated light beam using the collimation lens. When the hologram pattern represented on the spatial light modulator SLM is written using the plane wave light, it is preferable to provide the plane wave light as the back light to the spatial light modulator SLM. On the contrary, when the hologram pattern represented on the spatial light modulator SLM is written using the spherical wave light, it is preferable to provide the spherical wave light as the back light to the spatial light modulator SLM. Therefore, we will explain about the back light unit providing the spherical wave light.

Figure 7A:
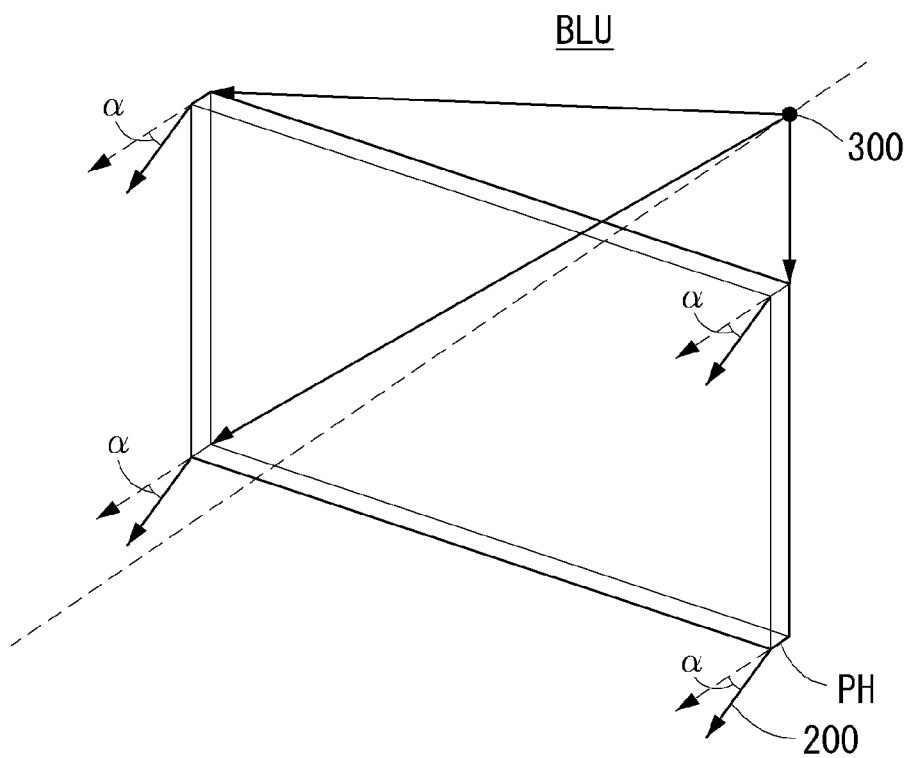
FIG. 7A is a schematic view illustrating a structure of the back light unit providing the direction controllable light beam using the spherical wave light according to the fifth embodiment of the present disclosure.

Referring to FIG. 7A, we will explain about the fifth embodiment of the present disclosure. FIG. 7A is a schematic view illustrating a structure of the back light unit providing the direction controllable light beam using the spherical wave light according to the fifth embodiment of the present disclosure.

The back light unit according to the fifth embodiment of the present disclosure comprises a viewing area control film PH, and a light source 300 disposed at the one side of the viewing area control film PH. The viewing area control film PH may be a holographic optical element having the viewing area of the back light. For example, the viewing area control film PH may be the HOE (Holographic Optical Element). The viewing area control film PH may be a film having the hologram patterns. The viewing area control film PH may have the diffraction interference patterns of the reference light beam and the object light beam, for using the holography features. The diffraction interference patterns may have the patterns for controlling the object light beam is emitted to a pre-determined direction within a pre-determined viewing area, when the reference light beam is radiated to the viewing area control film PH. Especially, the viewing area control film PH according to the fifth embodiment may have the diffraction interference patterns written using the spherical wave light.

In this case, the light source 300 may generate the spherical wave light. For example, it may be a point light source radiating the light from one point to all radial directions. In that case, the point light source may be located on the line extended from the center point of the viewing area control film PH. The back light unit BLU according to the fifth embodiment may comprise the point light source 300 generating the spherical wave light and a viewing area control film PH having the pattern written using the spherical wave light. Collimation lens CL is needed when the light source is collimated plane wave light. However, if the light source is spherical light which is not collimated, the collimation lens CL is not needed. A collimation lens CL may be included but may cause issues when creating the holographic image. The holography pattern can be written by using the spherical wave light if the spherical wave has a high coherence property. In alternative embodiments, the holography pattern can be written using plane wave light. For writing the holography pattern, the reference light and the object light would have two properties, collimation and coherence. However, when light has any one property, it can be used as the reference light and the object to write the holography pattern. This is generally known for the ordinary skilled person.

Furthermore, although not shown in FIG. 7A, the light source 300 may include a holographic optical film BSH and a reference light source RL, as shown in FIG. 4A. If the light source 300 should generate the spherical wave light, then the holographic optical film BSH would preferably have a diffraction interference pattern written using the spherical wave light.

Figure 7B:
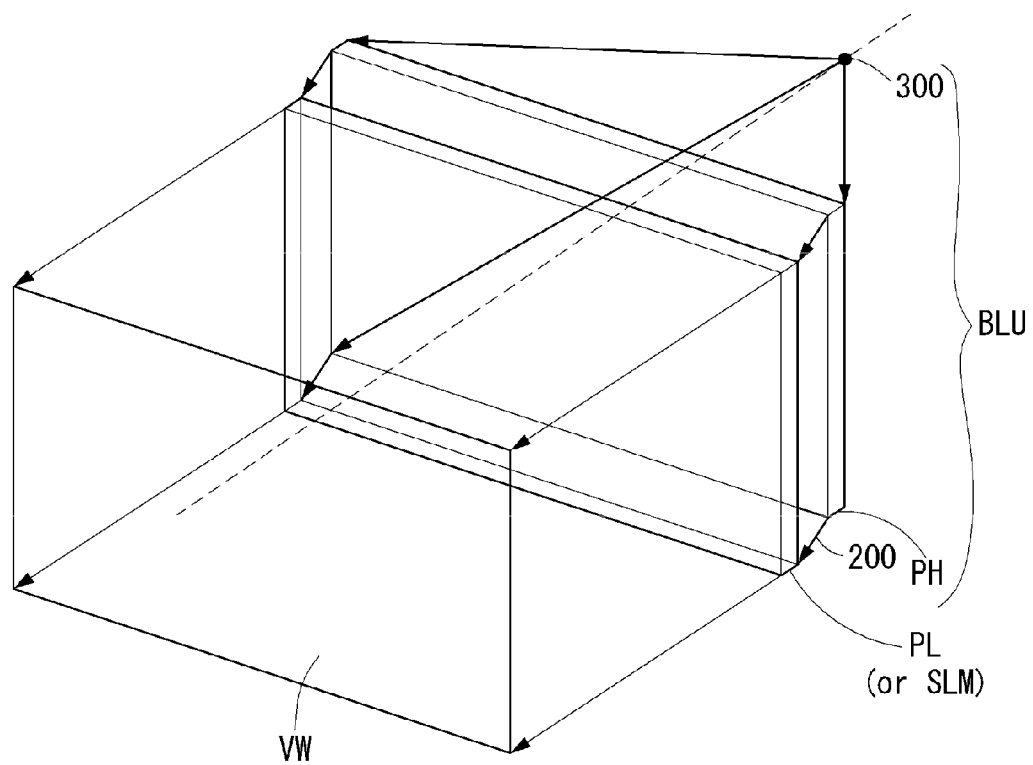
FIG. 7B is a schematic view illustrating the holography 3D display system using the back light unit according to the fifth embodiment of the present disclosure.

We will explain about the holography 3D display system applied with the back light unit according to the fifth embodiment of the present disclosure. FIG. 7B is a schematic view illustrating the holography 3D display system using the back light unit according to the fifth embodiment of the present disclosure.

Referring to FIG. 7B, the 3D display system according to the fifth embodiment comprises a spatial light modulator SLM representing the hologram pattern corresponding to the 3D images/videos, and a back light unit BLU disposed at the rear side of the spatial light modulator SLM. The back light unit BLU, having the same structure shown in FIG. 7A, includes a viewing area control film PH, and a light source 300 disposed at the one side of the viewing area control film PH.

In the structure of the 3D display system as shown in FIG. 7B, the light radiated into the spatial light modulator SLM is preferably the direction controllable light beam 200 entering with the incident angle of α. Therefore, the viewing area control film PH preferably has the hologram patterns for receiving the spherical wave light and for emitting the collimated light beam 200 propagating downward from the normal line (parallel to the light axis 300) of the surface of the viewing area control film PH.

In the fifth embodiment, a collimation lens is not used. Therefore, the back light unit according to the fifth embodiment generates the spherical wave light. So, it is preferable that the spatial light modulator SLM represents the hologram pattern for reproducing the 3D images/videos using the spherical wave light.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A backlight unit comprising:
   a light source for generating light; and
   a light direction controller including a collimation lens for converting the light generated from the light source into a collimated light beam without a refraction angle relative to a light axis of a center of the collimation lens, and the light direction controller further converting the collimated light beam into a direction controlled collimated light beam having a refraction angle, the direction controlled collimated light beam emitted to a predetermined area to generate a three-dimensional holographic image;
   wherein the light source is positioned on the light axis connecting the center of the collimation lens to a center of a focal plane of the collimation lens.

2. The backlight unit of claim 1, wherein the light direction controller comprises:
   a prism sheet for converting the collimated light beam without the refraction angle into the direction controlled collimated light beam having the refraction angle relative to the light axis of the center of the collimation lens.

3. The backlight unit of claim 2, wherein the light source is positioned a focal length from a first side of the collimation lens and wherein the prism sheet is positioned at a second side of the collimation lens opposite the position of the light source.

4. The backlight unit of claim 2, wherein the light source comprises a holographic optical film that includes a diffraction pattern for uniformly radiating the light generated from the light source to the collimation lens.

5. The backlight unit of claim 4, wherein the light source further comprises:
   a scanning device for generating the light in a plurality of directions in order to generate different views of the three-dimensional holographic image or to generate different three-dimensional holographic images for different observers of the three-dimensional images, wherein the plurality of directions comprises a first direction toward a center of the holographic optical film, a second direction toward a left of the center of the holographic optical film, and a third direction toward a right of the center of the holographic optical film.

6. The backlight unit of claim 5, wherein the light direction controller converts the light from the light source into the direction controlled collimated light beam having a plurality of refraction angles based on a direction of the light toward the holographic optical film.

7. The backlight unit of claim 1, wherein the direction controlled collimated light beam is emitted to the predetermined area of a spatial light modulator including a holographic pattern associated with the three-dimensional holographic image.

8. The backlight unit of claim 1, wherein the backlight unit is positioned at a rear side of a display panel, wherein the backlight unit is vertically misaligned with the position of the display panel.

9. The backlight unit of claim 1, further comprising:
   a viewing area control film for controlling the emission of the direction controlled collimated light beam to the predetermined area corresponding to a viewing area of the three-dimensional holographic image.

10. The backlight unit of claim 1, wherein the light source generates plane wave light or spherical wave light.

11. The backlight unit of claim 10, wherein the light direction controller comprises:
    a viewing area control film for converting the spherical light from the light source into the direction controlled collimated light beam having the refraction angle.

12. A display system comprising:
    a display panel for outputting a three-dimensional holographic image; and
    a back light unit positioned at a rear side of the display panel, the back light unit including:
      a light source for generating light; and
      a light direction controller including a collimation lens for converting the light from the light source into a collimated light beam without a refraction angle relative to a light axis of a center of the collimation lens, and the light direction controller further converting the collimated light beam into a direction controlled collimated light beam having a refraction angle, the direction controlled collimated light beam emitted to a predetermined area of the display panel to generate the three-dimensional holographic image;
      wherein the light source is positioned on the light axis connecting the center of the collimation lens to a center of a focal plane of the collimation lens.

13. The display system of claim 12, wherein the light direction controller comprises:
    a prism sheet for converting the collimated light beam without the refraction angle into the direction controlled collimated light beam having the refraction angle relative to the light axis of the center of the collimation lens.

14. The display system of claim 13, wherein the light source comprises a holographic optical film that includes a diffraction pattern for uniformly radiating the light generated from the light source to the collimation lens.

15. The display system of claim 14, wherein the light source further comprises:
- a scanning device for generating the light in a plurality of directions in order to generate different views of the three-dimensional holographic image or to generate different three-dimensional holographic images for different observers of the three-dimensional images, wherein the plurality of directions comprises a first direction toward a center of the holographic optical film, a second direction toward a left of the center of the holographic optical film, and a third direction toward a right of the center of the holographic optical film.

16. The display system of claim 15, wherein the light direction controller converts the light from the light source into the direction controlled collimated light beam having a plurality of refraction angles based on a direction of the light toward the holographic optical film.

17. The display system of claim 12, further comprising:
- a viewing area control film for controlling the emission of the direction controlled collimated light beam to the predetermined area corresponding to a viewing area of the three-dimensional holographic image.

18. The display system of claim 12, wherein the light source generates plane wave light or spherical wave light.

19. The display system of claim 18, wherein the light direction controller comprises:
- a viewing area control film for converting the spherical light from the light source into the direction controlled collimated light beam having the refraction angle.

* * * * *